UNITED STATES PATENT OFFICE 2,090,625

HYDRAULIC GYPSUM CEMENT MATERIAL AND PROCESS OF MANUFACTURING THE SAME

Robert S. Edwards, Milton, Mass., assignor to Rumford Chemical Works, Rumford, R. I., a corporation of Rhode Island No Drawing. Application May 14, 1936, Serial No. 79,720

20 Claims. (Cl. 106—34)

This invention relates to artificial cementitious materials and their manufacture and is more specifically concerned with the production of a modified hydraulic gypsum cement which becomes densely consolidated on setting.

It is a general object of the invention to provide a process and a composition of matter for the treatment of natural mineral gypsums or anhydrites and artificially prepared hydrated or dehydrated calcium sulphates whereby improved hydraulic gypsum cement products can be obtained from these raw materials by a regulated procedure which is economical and may be practiced readily and efficiently on a commercial basis.

Another object of the invention is to provide a process and a composition of matter whereby natural gypsums and artificially prepared calcium sulphates containing impurities normally capable of detrimentally affecting the quality of hydraulic gypsums prepared therefrom can be treated to yield useful and improved hydraulic gypsums.

Still another object of the invention is to provide a process and a composition of matter for the preparation from natural and artificial hydrated or dehydrated gypsums of improved hydraulic gypsum cements characterized by accelerated setting and the development of a high strength and a dense weather resisting hard surface without use of mechanical tamping means.

Other objects of the invention will in part be obvious and will in part appear hereinafter.

The invention accordingly comprises the several steps and the relation of one or more of such steps with respect to each of the others, the range of treatment, and treating agent compositions possessing the properties and relation of constituents which are exemplified in the following detailed disclosure.

Hydraulic gypsum is not in itself a new cementitious material, the so-called Roman cement being a crude form of hydraulic gypsum made by high temperature calcination of natural hydrated gypsum. Hydraulic gypsum cements, made by calcining natural rock gypsum in an oxidizing atmosphere at temperatures from 1450° F. to 2300° F. in kilns of varied types of construction, are also well known and have found use alone or blended with Portland cement as flooring materials and for exterior stucco work.

The temperatures employed for the production of hydraulic gypsum cements through dehydration of rock gypsum distinguish the manufacturing process from that used in making the so-called Keene's cement from hydrated gypsum as according to U. S. Patent 1,993,238 the manufacture of Keene's cement is preferably carried out within a temperature range of 950° F. to 1300° F.

A third type of gypsum cement is the so-called plaster of Paris which is made by the partial dehydration of hydrated gypsums in kettles or equivalent devices at relatively low temperatures, 330° F. to 350° F. being specified as a desirable temperature range for the production of hemihydrate "calcined" gypsum.

Various proposals have been made to modify the properties of plaster of Paris and Keene's cement by the addition of chemical agents to the gypsum prior to the partial dehydration or furnacing steps or by carrying out the partial dehydration or furnacing under special controlled oxidizing or reducing or pressure conditions thus securing desirably changed physical characteristics in the final hydrated set material, such additions of chemical agents being distinct 'n their purpose from the usual additions of conventional accelerators to the partially dehydrated or furnaced gypsum cement product.

Thus it has been suggested that aluminum sulphate be added to by-product gypsum derived from phosphoric acid processes and intended for the manufacture of plaster of Paris, as a means for overcoming the detrimental effect of impurities in by-product gypsum, such impurities being principally silica and mono- and tri-calcium phosphates.

Also in the manufacture of Keene's cement it has been customary practice to add alum as a conditioning agent either before furnacing the gypsum or prior to a second furnacing, and additionally it has been proposed to treat the raw gypsum before furnacing with such chemical substances as alkali and alkaline earth sulphates, alkali and alkaline earth borates, metal sulphates and sulphuric acid as a means for improving the setting time, density and strength of the final product.

It has been further suggested that the hardness and insolubility of gypsum cements of the Keene type, prepared by furnacing at 1100° F., can be increased by adding to material which has been furnaced and ground, iron filings, copper sulphate and alkali-metal bisulphates with an optional addition of alkaline earth phosphates as a means of obtaining increased strength in the set material through the liberation of phosphoric acid by interaction of the phosphate and bisulphate, said phosphoric acid not only improving the strength but through further reaction with the copper salt forming an insoluble protective envelope around the calcium sulphate crystals.

Still another proposal for a modified Keene's cement made from by-product gypsum involves pretreatment prior to furnacing with sulphuric acid or, as an alternative, the admixture of a decomposable sulphate with the hot furnaced dehydrated gypsum.

It has also been suggested that the color of anhydrous gypsum prepared by furnacing at approximately 1400° F. can be whitened and the product made available for use as a dentrifice or similar mild abrasive by mixing with the gypsum, prior to furnacing, phosphate salts such as mono- or di-calcium phosphate, mono-sodium phosphate, pyro-sodium phosphate, or mono-ammonium phosphate, mono-calcium phosphate being the preferred agent for the prevention of discoloration.

It is generally known that hydraulic gypsum made by the usual calcination processes varies in the time required for setting and hardening, and while this lack of uniformity is in part the result of variations in the impurities and percentage of impurities present in natural and artificial gypsums, I have found that variations in the physical nature of hydraulic gypsums determine in large part the setting mechanism and the characteristics of the set products. The important properties of cementitious materials are water to cement ratio, time required for initial and final set, hardening rate, strength of the set and hardened product in compression and tension, carrying capacity for inert fillers such as sand, and the volume relation of the initial and final set product. Utilizing known methods of making hydraulic gypsum it is difficult if not impossible to secure a useful relation of these separate properties in one product. For example hydraulic gypsums which in the set form are relatively strong in compression and tension usually acquire an initial set so slowly that they can only be used for horizontal surfaces, and conversely hydraulic gypsums with faster setting rates yield set products of unsatisfactory strength.

I have made an extensive series of investigations of the microstructures of natural and pure and impure artificial gypsums calcined over a wide range of temperatures, and I have found that in the case of pure gypsums an alteration or transition in crystal form, distinguished by a peculiar type of massive grain growth becomes pronounced, at approximately 2200° F. with marked changes in the physical characteristics of the calcined anhydrous gypsum or anhydrite. The exact temperature of this change or transition point seems somewhat dependent on the degree of dissociation of the calcined gypsum and the development of basicity, as minor increases in the percentage of calcium carbonate, which is nearly always present in natural rock gypsums, differentially lower the transition point below 2200° F. Also I have found that other impurities present in natural rock gypsums such as silica, iron and alumina and magnesium carbonate may act as partial inhibitors of recrystallization or grain growth at transition point temperatures usually without appreciable decrease in development of basicity.

When carbonate of lime, even though present to the extent of less than 1% by weight, is the principal impurity in a natural rock gypsum, I have found it impossible, irrespective of the calcination temperature, to produce therefrom hydraulic cements possessing useful set strength characteristics, whereas other natural rock gypsum containing in addition to calcium carbonate, silica, iron and alumina, and magnesium carbonate impurities when furnaced at approximately 2200° F. have yielded hydraulic cements of satisfactory set strengths, although such cements would seem to be limited in their commercial application through extremely slow development of their initial set.

To bring out more clearly the results of calcining various natural rock gypsums I have tabulated typical test runs:

| No. | Gypsum analysis | Calcining temp. | Dissoc. factor | Time to initially set | Strength in tension |
|---|---|---|---|---|---|
|  |  | ° F. | cc |  |  |
| 1 | Chemically pure | 2240 | 5.2 | Very slow | 375 lbs. (40 days) |
| 2 | CaSO₄2H₂O _____ 98.04%<br>CaCO₃ _____ 1.96% | 2240 | 12.0 | 4 hrs | 210 lbs. (40 days) |
| 3 | CaSO₄2H₂O _____ 97.07%<br>CaCO₃ _____ 2.93% | 2240 | 60.0 | 4 hrs | Less than 50 lbs. (40 days) |
| 4 | CaSO₄2H₂O _____ 92.27%<br>CaCO₃ _____ 4.00%<br>SiO₂ _____ 2.83%<br>Fe₂O₃ and Al₂O₃ ___ .90% | 2280 | 20.0 | Slow | 500 lbs. (30 days) |

The dissociation factor is an approximation represented by the number of cubic centimeters of 1/N sulphuric acid required to bring 100 grams of the calcined product to neutrality using phenolphthalein as the indicator.

The tabulation shows that when the principal impurity is calcium carbonate, the set strength decreases with increase in the carbonate content, and that the presence of silica and iron and alumina tends to inhibit the detrimental effect of the carbonate.

Studies of the microstructures of hydraulic gypsums after calcination, after addition of water to produce a set, and during the progression of setting, the hydraulic gypsums so observed being made from various natural and artificial hydrated gypsums, indicated some relation between the physical structure of the calcined material and the mechanism of the set, and determination of the dissociation factors also indicated that the physical structures which tended to give faster setting rates and higher set strengths were related to low dissociations as measured by my neutralization method.

I was however unable to secure from any natural or artificial gypsum source or mixtures of gypsum, hydraulic cements made by calcination at temperatures over 1500° F., which would acquire an initial set in one hour and which after seven days would give a strength under standard tension testing methods of 600 pounds per square inch.

I have discovered that by treatment of natural or artificial hydrated or dehydrated gypsums followed by calcination at temperatures within a certain range I cannot only secure useful physical, and perhaps chemical, characteristics which permit development of an initial set within approximately one hour and a set strength after seven days in excess of 600 pounds per square inch, but I have also found my new treatment process additionally yields a gypsum cementitious material which is less soluble in water than other gypsum cements irrespective of their type, and which is quite unlike the hitherto known hydraulic cements in that it possesses the property of retempering, that is to say the partly set product can be again made usable by addition of water. Also this gypsum cementitious material requires about the same water ratio as Portland cement, but is lower in its gauging water requirement than other hydraulic cements.

It will be seen that while I have described the product of my new process as a modified hydraulic gypsum it is actually a new cementitious gypsum material distinguished from hitherto known hydraulic gypsums by its property of retempering, its ability to promptly take an initial set, the development of final set strengths after seven days in excess of 600 pounds per square inch, and lower water to dry product ratios for application as cement.

In its broadest aspect my invention contemplates the treatment of suitably ground natural or artificial hydrated or dehydrated gypsums with a treating agent composed substantially of phosphoric acid, an alkaline phosphate such as monosodium ortho phosphate or sodium metaphosphate and silica or a silicate, and the subsequent calcination of the treated raw gypsum material at temperatures of 1800° F. to 2300° F. in suitable calcining devices which may be of the rotary kiln, continuous tunnel or other types.

The treating agent can be applied to the raw gypsums in dry form, as an aqueous solution or can be added as a paste during the operation of grinding the raw gypsum or other equivalent means, the important requirement being uniformity and intimacy of disposition throughout the raw gypsum.

The amount of the composite treating agent used for any given raw gypsum source varies with the nature and amount of impurities present in the raw gypsum, but does not exceed even in the case of relatively impure gypsums, 1% of ortho phosphoric acid, 0.5% of mono-sodium ortho phosphate or sodium metaphosphate and 3% of silica in the treated gypsum prior to calcination.

As illustrative of the manner of processing raw gypsums to secure improved hydraulic gypsums and the manner in which these results are effected, the following examples are presented:

*Example 1.*—Natural rock gypsum having as its constituents,

| | Per cent |
|---|---|
| $CaSO_4.2H_2O$ | 99.30 |
| $CaCO_3$ | .49 |
| $SiO_2$ and insol | .11 |
| $MgCO_3$ | .08 |
| $Fe_2O_3$ and $Al_2O_3$ | Trace | is pulverized in a swing-hammer mill so that the semi-fine product will pass a 50–60 mesh screen. The ground material is mixed with 20 pounds powdered silica per 2000 pounds of gypsum and the mixture is fed by a weight control device into a pelletizing machine consisting of a cylindrical tumbling barrel equipped with flights and a perforated pipe (see U. S. Patent 1,973,473) through which is sprayed on to the gypsum-silica mixture a controlled volume of an aqueous solution containing 18% ortho phosphoric acid and 6% monosodium ortho phosphate by weight, the weight of gypsum-silica mixture and volume of treating agent being proportioned and adjusted to give 0.6% ortho phosphoric acid and 0.2% mono-sodium orthophosphate dry basis content of the pelletized mix.

The pelletized mix is loaded into the cars of a continuous tunnel kiln having a controlled "hot zone" temperature of 2100° F. to 2200° F. and a "cold end" discharge temperature of 500° F. The granular nodules resulting from the calcining operation are run through a rotary cooler and fed to a tube mill for final pulverizing before elevation to the storage bin. When the product is intended for use as a cement, the usual gypsum accelerators or catalysts are added to the mixture after the rotary cooler and prior to the tube mill.

Cementitious material prepared in the above manner and catalyzed with a mixture of potassium sulphate and zinc sulphate was compared with similarly catalyzed material prepared in the same manner but without addition of silica or ortho phosphoric acid and mono-sodium orthophosphate. After addition of the necessary amount of water to give a normal consistency mix, the following results were obtained:

| | Dissociation factor | Initial set | Final set | Strength per sq. in. in 30 days |
|---|---|---|---|---|
| | cc. | | | Pounds |
| Untreated | 9.8 | 1'40" | 2'50" | 300 |
| Treated | 0.25 | 50" | 1'40" | 900 |

*Example 2*

Dried by-product gypsum derived from the manufacture of phosphoric acid by sulphuric acid treatment of phosphate rock and having the following approximate composition:

| | Per cent |
|---|---|
| $CaSO_4.2H_2O$ | 97.40 |
| $SiO_2$ and insol | 0.80 |
| $Fe_2O_3$ and $Al_2O_3$ | 0.65 |
| $Ca_3(PO_4)_2$ | 0.60 | was treated and pelletized with a solution of ortho phosphoric acid and monosodium orthophosphate to give 0.8% ortho phosphoric acid and 0.3% monosodium orthophosphate dry basis analysis of the treated gypsum.

The pelletized product was calcined in a saggar crucible in an electric furnace at 2260° F., cooled, ground and catalyzed with a mixture of potassium sulphate and zinc sulphate. Another portion of the same by-product gypsum was pelletized with distilled water, calcined in the same electric furnace as the treated material and at the same temperature. It was cooled, ground and catalyzed with a mixture of potassium sulphate and zinc sulphate. Comparative tests were made, after addition of the necessary amount of water to produce a normal consistency mix, with the following results:

| | Dissociation factor | Initial set | Final set | Strength per sq. in. in 30 days |
|---|---|---|---|---|
| | cc. | | | Pounds |
| Untreated | 4.5 | 2'3" | 5'00" | 400 |
| Treated | 1.6 | 0'50" | 1'20" | 1050 |

Two sets of seven other natural and artificial hydrated gypsums of various degrees of purity were calcined at 1800° F.–2260° F. in the equipment described in Example 2, one set of seven samples being untreated and the other set being treated with ortho phosphoric acid and monosodium orthophosphate with a silica addition. The proportions of treating agents were approximated from the analyses of the gypsums, so that the percentages of treating agents expressed on a dry basis and on the raw treated and uncalcined gypsums ranged from 1% ortho phosphoric acid and 0.4% mono-sodium orthophosphate for a natural anhydrite containing 4% calcium carbonate and 2.83% silica and insoluble, to 0.4% ortho phosphoric acid and 0.2% mono-sodium phosphate for an artificial precipitated gypsum containing no calcium carbonate 1.0% silica insoluble, and 0.4% iron and aluminum oxides.

All of the calcined gypsums were cooled, ground and catalyzed with the same amount of a conventional "catalyst" mixture of potassium sulphate and zinc sulphate. The dissociation factors of the untreated samples ranged from 6.0 cc. to 70 cc. whereas the treated samples ranged from 0.1 cc. to 3.0 cc. After incorporation with the appropriate amount of water, initial sets were obtained on the untreated materials in from one hour twenty minutes to six hours, with final sets in from three hours to eight hours. The treated materials had practically uniform initial set of from fifty to sixty minutes and a practically uniform final set of eighty to one hundred minutes.

Tension tests on the catalyzed and set hardened materials made at the end of thirty days gave values for the untreated calcined gypsums of 200 to 500 pounds per square inch, whereas the treated samples gave values of 900 to 1300 pounds per square inch.

*Example 3*

Natural rock gypsum, similar to the gypsum used in Example 1 was calcined at 1500° F. for two hours. The resulting product proved to be "dead" burned and had substantially no setting properties. This "dead" burned material was mixed with 1% of its weight of powdered silica, and treated and pelletized by the procedure of Example 1, the treating agent being proportioned so that the treated product contained 0.5% orthophosphoric acid and 0.2% sodium metaphosphate. The pelletized mix was calcined at 1990° F. to 2000° F., and thereafter cooled, ground, and "catalyzed" or accelerated with a mixture of potassium sulphate and zinc sulphate. The cementitious product, which had a water-cement ratio of 25 cc. acquired its initial set in one hour twenty minutes, a final set in two hours and had a strength in tension of 960 lbs. at the end of thirty days.

Because grain growth seemed to be a characteristic of calcined but untreated hydraulic gypsum, and inhibition of grain growth a characteristic of calcined gypsum treated by my process, it seemed necessary to determine whether the improved results were related solely to the smaller size of the crystalline particles which microscopically characterize my improved hydraulic gypsum.

In general the larger the surface available for a given reaction the greater the speed of the reaction, so it was concluded that if particle size contributed to the improved results, the characteristics of an untreated calcined hydraulic gypsum would be improved by long continued fine grinding until the particle sizes were approximately equivalent to the size of my inhibited grain particles. Also consideration was given to the marked differences in dissociation as evidenced by my titration method, and to the possibility that the set was delayed and final set strength decreased through some undesirable effect brought about by the higher degree of basicity.

To determine these questions a natural rock gypsum which had shown medium and not excessive grain growth when calcined was selected. Part of the sample was treated by adding 0.8% silica and thereafter pelletized with the phosphoric acid-sodium phosphate reagent so that the treated gypsum contained 0.7% orthophosphoric acid and 0.3% monosodium orthophosphate. The material was furnaced in a 3" layer in a saggar crucible in an electric furnace at 2240° F. Another part of the same sample, without addition of silica, was ground and pelletized with distilled water only. It was calcined in a 3" layer in a saggar in the same electric furnace used for the calcination of the treated material, at the same 2240° F. temperature. One-half of this untreated furnaced gypsum was ground for four hours in a ball mill, the fractured particles being then of approximately the same size as the inhibited grains obtained by treatment of another sample of the same gypsum by my reagent. To the other half of the untreated calcined gypsum I added the same percentage amount of ortho phosphoric acid and monosodium orthophosphate I had used for the treated sample, and to secure complete admixture and to promote any reaction I returned the material to the ball mill and ground it for more than an hour.

I thus had four samples made from the same natural gypsum under the same calcining temperature conditions, one treated according to my new method, one untreated, another untreated but having a particle size equivalent to the inhibited crystalline grain size obtained by my treating process, and still another which represented equivalent particle size with an addition in the cold of the same treating agents in the same percentages I had used in the preparation of hydraulic gypsum according to my method. I catalyzed all four materials with the same amounts of a mixture of potassium sulphate and zinc sulphate and after the addition of the necessary amounts of water I compared setting times and strengths. The results were:

| Material | Dissociation factor | Initial set | Final set | Strength per sq. in. in 30 days |
|---|---|---|---|---|
| | | | | *Pounds* |
| Treated | 0.8 cc. | 0' 40" | 1' 30" | 900 |
| Untreated | 20. cc. | 4' 30" | +8' 0" | 150 |
| Untreated but ground | 20. cc. | 2' 30" | 5' 0" | 180 |
| Untreated, ground, reagents added | Neutral | 3' 55" | +8' 0" | 210 |

Based on these tests, mechanical reduction in particle size does not appreciably affect the time required for initial and final set or the strength and additions of my reagents in the cold after high temperature calcination of untreated gypsum do not produce the useful and novel effect I secure by my treatment prior to calcination.

The water-cement ratio of my new cementitious material provides still another distinction from other hydraulic gypsums. This ratio is of practical importance because it plays a part in determining the ultimate strength and hardness of set work made from cements. In general the lower the water ratio, the stronger the cement and the less the shrinkage and tendency to crack during the acquirement of the final hardened set.

The water-cement ratio or consistency of a cement is usually determined by the modified Vicat apparatus, using the procedure called for in American Society for Testing Materials circular No. c 26–32 T, Sections 14 to 16.

Using this accepted test method my new hydraulic gypsum has a water-cement ratio of 24 cc. to 27 cc. which is lower by at least 6 cc. than any other cementitious material made from gypsum, this irrespective of whether such comparative materials are of the hydraulic gypsum, Keene's cement, or plaster of Paris types.

I have not attempted to develop herein any completely comprehensive theory as to the nature of the physical and chemical changes which result from the use of my treating process and treating agent in the high temperature calcination of gypsums, or the physical and chemical mechanisms which come into play when set products result from the addition of suitable amounts of water mixed with my dry catalyzed or non-catalyzed material. Without being bound in any way by the following suggestions it seems possible that the treating agent and treatment has a tendency both to inhibit the increase in grain size which results from the recrystallization effect, when gypsums are calcined at temperatures of 1800° F. to 2300° F., as well as to reduce the sharp increase in the rate of grain growth associated with temperatures approximating 2200° F. This inhibition is possibly due to the treating agent forming inter-growths with the anhydrite grains or producing some surficial alteration at the high temperature which prevents the formation of large individual grains.

It is also possible that the inhibition of grain growth with the consequent increase in anhydrite grain surface area changes the setting mechanism and results in a set material which is essentially anhydrite grains cemented together or inosculated by hydrated gypsum developed from and at the anhydrite grain surfaces. The high strengths of the set material, especially in compression, may therefore result from the presence of residual unchanged anhydrite grains particularly as my final hardened cements do not reach the full state of hydration represented by $CaSO_4.2H_2O$.

Any present theoretical interpretation of an invention or discovery in this field is rendered difficult by reason of some disagreement among leading authorities as to those factors which are observable under comparative magnifications.

Regardless of theory my invention is such a definite contribution to the practical art that there is no question but that my new process and treating agent when employed with natural rock gypsums and anhydrites and artificially prepared calcium sulphates result in the production of cementitious gypsum materials characterized by properties possessed by no other high temperature calcined gypsum products, and it is to such cementitious gypsum products and the process for their production that the following claims are directed.

The details used to describe the process and product constitute a practical integration and embodiment of my invention, but I wish to state that I do not limit myself to these precise details, since manifestly the same may be varied without departing from the spirit of the invention as defined in the appended claims.

What I therefore claim and desire to secure by Letters Patent is:—

1. A method of improving the properties of hydraulic cementitious gypsum materials consisting in intimately mixing phosphoric acid and sodium phosphate in an amount not exceeding two percent by weight with hydrated gypsum and dehydrating and calcining the mixture at 1800° F. to 2300° F.

2. A method of improving the properties of hydraulic cementitious gypsum materials consisting in intimately mixing phosphoric acid and sodium phosphate in an amount not exceeding two percent by weight with anhydrous gypsum and calcining the mixture at 1800° F. to 2300° F.

3. A method of producing improved hydraulic cementitious gypsum materials consisting in intimately mixing phosphoric acid and sodium phosphate in an amount not exceeding two percent by weight and silica in an amount not exceeding three percent by weight with hydrated gypsum and dehydrating and calcining the mixture at 1800° F. to 2300° F.

4. A method of producing improved cementitious hydraulic gypsum materials consisting in intimately mixing not more than two percent by weight of phosphoric acid and sodium phosphate and not more than three percent by weight of silica with anhydrous gypsum and calcining the mixture at 1800° F. to 2300° F.

5. A process of treating hydrated gypsum by the addition of a solution containing not more than two percent by weight, on the basis of the gypsum, of phosphoric acid and sodium phosphate, forming the mixture into pellets, calcining at 1800° F. to 2300° F., and grinding the calcined material.

6. A process of treating anhydrous gypsum by the addition of a solution containing not more than two percent by weight, on the basis of the gypsum, of phosphoric acid and sodium phosphate, forming the mixture into pellets, calcining at 1800° F. to 2300° F., and grinding the calcined material.

7. A process of treating hydrated gypsum by addition of not more than three percent by weight of silica and not more than two percent by weight of phosphoric acid and sodium phosphate, moistening the mixture, forming the moistened mixture into pellets, calcining the pellets at 1800° F. to 2300° F., and grinding the calcined material.

8. A process of treating anhydrous gypsum by addition of not more than three percent by weight of silica and not more than two percent by weight of phosphoric acid and sodium phosphate, moistening the mixture, forming the moistened mixture into pellets, calcining the pellets at 1800° F. to 2300° F. and grinding the calcined material.

9. In the production from hydrated gypsums of an improved hydraulic calcined gypsum material capable of acquiring an initial set in less than ninety minutes and after seven days a hardened strength in tension of more than 600 pounds per square inch, those steps which consist in adding a treating agent before calcination composed of phosphoric acid, sodium phosphate and silica in an amount not exceeding five percent by weight of the hydrated gypsum and in calcining the mixture at 1800° F. to 2300° F.

10. In the production from anhydrous gypsum of an improved hydraulic calcined gypsum material capable of acquiring an initial set in less than ninety minutes and after seven days a hardened strength in tension of more than 600 pounds per square inch, those steps which consist in adding a treating agent composed of phosphoric acid, sodium phosphate and silica in an amount not exceeding five percent by weight of the anhydrous gypsum and in calcining the mixture at 1800° F. to 2300° F.

11. The process herein described of producing from gypsum a new cementitious material having a water to cement ratio of not more than 27 cc., an initial setting time of not more than ninety minutes, and a hardened strength after seven days of more than 600 pounds per square inch measured in tension, which consists in mixing the gypsum with an agent composed of phosphoric acid, an alkaline phosphate and silica in an amount not exceeding five percent of the weight of the gypsum, calcining the gypsum and agent at a temperature of 1800° F. to 2300° F., cooling and adding an accelerator and grinding.

12. The method herein described of producing hydraulic gypsum cement by mixing gypsum with a treating agent comprising phosphoric acid and an alkaline phosphate in an amount sufficient to act as an inhibitor of anhydrite recrystallization and dissociation when the mixture is calcined at temperatures between 1800° F. and 2300° F., pelletizing the mixture, calcining the pelletized mixture at 1800° F. to 2300° F., grinding the calcined pellets, and adding an accelerator substantially as set forth.

13. A gypsum material containing phosphoric acid and an alkaline phosphate in an amount sufficient to act as an inhibitor of anhydrite recrystallization to preclude dissociation of the anhydrite when the same is calcined at temperatures between 1800° F. and 2300° F.

14. A hydraulic cementitious calcined gypsum material, comprising anhydrous calcium sulphate reacted with phosphoric acid and an alkaline phosphate in an amount sufficient to substantially inhibit anhydrite recrystallization and dissociation when the mixture is heated at temperatures between 1800° F. and 2300° F.

15. The product of the method set forth in claim 12 the same being a set and hardened hydraulic gypsum cement having a strength in tension of more than 600 pounds per square inch, comprising substantially anhydrite grains cemented together by hydration of the grain surface.

16. In the production of hydraulic cementitious gypsum materials, the method which consists in pelletizing gypsum prior to calcination by mixing therewith phosphoric acid and an alkaline phosphate, in an amount sufficient to substantially inhibit anhydrite recrystallization and dissociation when the pelletized mixture is calcined at temperatures in excess of 1800° F., and in calcining said mixture at such temperatures.

17. The method of claim 16, the pelletized mixture being calcined in a layer not exceeding four inches in thickness.

18. The method herein described of producing hydraulic gypsum cement by mixing gypsum with a treating agent comprising phosphoric acid and an alkaline phosphate in an amount sufficient to act as an inhibitor of anhydrite recrystallization and dissociation when the mixture is calcined at temperatures between 1800° F. and 2300° F. and in calcining the mixture between said temperatures.

19. A hydraulic cementitious calcined gypsum material, comprising anhydrous calcium sulphate reacted with phosphoric acid, an alkaline phosphate and silica in an amount sufficient to substantially inhibit anhydrite recrystallization and dissociation when the mixture is heated at temperatures between 1800° F. and 2300° F.

20. A pulverulent hydraulic cementitious calcined and catalyzed gypsum material, comprising the products of the reaction of gypsum and an amount of phosphoric acid, an alkaline phosphate and silica sufficient to substantially eliminate anhydrite recrystallization and dissociation when the mass is heated to temperatures between 1800° F. and 2300° F. in admixture with a catalyst.

ROBERT S. EDWARDS.